United States Patent [19]

Lopez

[11] Patent Number: 4,779,569
[45] Date of Patent: Oct. 25, 1988

[54] FOOD PRODUCT DISPENSING APPARATUS

[76] Inventor: Bernard V. Lopez, 1002 Sheridan Ave., Escondido, Calif. 92027

[21] Appl. No.: 7,931

[22] Filed: Jan. 28, 1987

[51] Int. Cl.[4] ............................................. A01K 5/02
[52] U.S. Cl. ............................. 119/51.11; 119/52 AF
[58] Field of Search ............. 119/51.11, 51.12, 52 AF, 119/56 R

[56] References Cited

U.S. PATENT DOCUMENTS

| | | | |
|---|---|---|---|
| 2,538,413 | 1/1951 | Chard | 119/51.11 |
| 2,981,229 | 4/1961 | Brown | 119/52 AF |
| 3,340,851 | 9/1967 | Frank et al. | 119/56 R |
| 3,352,286 | 11/1967 | Pickelsimer | 119/51.11 |
| 3,528,588 | 9/1970 | Moore | 119/51 R |
| 3,648,660 | 3/1972 | Esquival | 119/51.11 |
| 3,678,902 | 7/1972 | Ruth | 119/51.11 |
| 4,050,415 | 9/1977 | Conger | 119/56 R |
| 4,235,200 | 11/1980 | Shay | 119/51.11 |
| 4,292,930 | 10/1981 | Olsen | 119/51.11 |
| 4,688,520 | 8/1987 | Parks | 119/51.11 |

*Primary Examiner*—John J. Wilson
*Attorney, Agent, or Firm*—Brown, Martin, Haller & Meador

[57] ABSTRACT

An animal food product dispensing apparatus comprising a housing having a food dispenser port and a hopper, or similar storage container for storing food, mounted inside with a feed port through which food is transferred by gravity flow to an articulated chute assembly. The articulated chute assembly has walls for guiding food between the feed port and the dispenser port. A reciprocating driver element coupled to the chute assembly moves portions of the chute assembly up and down with respect to a fixed pivot point adjacent to the feed port between food collection and dispensing positions. A lower support can be used adjacent to the storage container for supporting a lower portion of the storage container and guiding food into the articulated chute assembly. The reciprocation drive comprises a push bar attached between the chute assembly and a cam driven by an electric motor at a predetermined rate. A switch provides electrical power to the motor when the articulated chute assembly is not in the food collection position and a relay provides electrical power to the motor for a predetermined length of time regardless of the articulated assembly chute position.

In further aspects of the invention, the hopper further comprises an adjustable metering plate positioned to close off at least a portion of the feed port. A guide plate can be mounted adjacent to the dispenser port for supporting and guiding a lower portion of the chute assembly and preventing interference with adjacent structures.

12 Claims, 2 Drawing Sheets

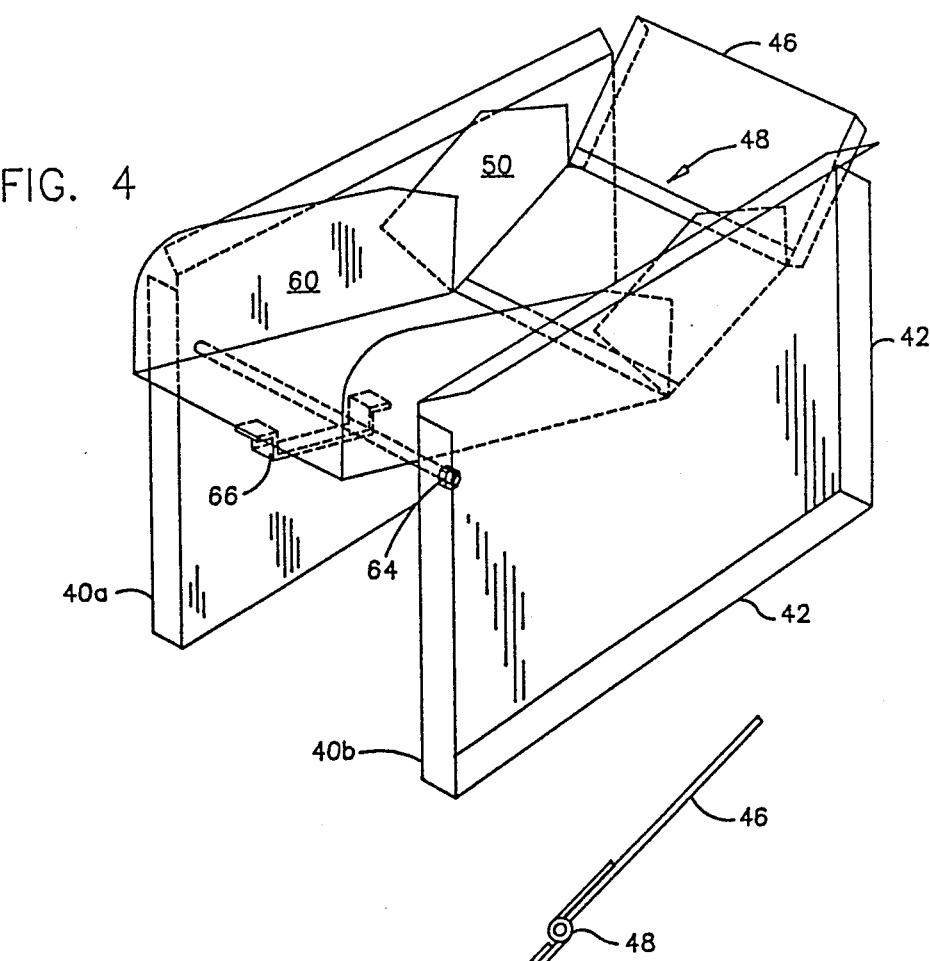
FIG. 4
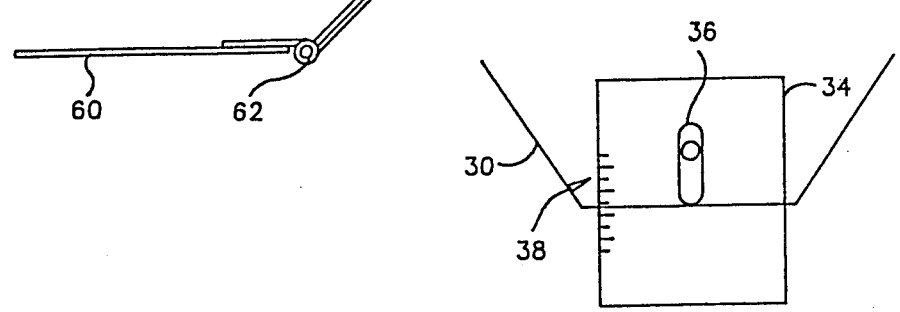
FIG. 5
FIG. 3

FOOD PRODUCT DISPENSING APPARATUS

BACKGROUND OF THE INVENTION

1. Field of the Invention

This invention relates to animal husbandry and more particularly to an apparatus and method for storing and dispensing food products for consumption by animals. The invention further relates to an apparatus having a housing for long term storage of food coupled to a motor powered measuring and dispensing means which deposits predetermined portions of food in a container or location for consumption by an animal.

2. Background

Modern day animal feed products, including those intended for domesticated dogs, cats, and similar animals, are capable of being stored in a "open air" environment for extended periods of time. Because of the ability to survive for long periods of time, these foodstuffs can be left in large containers for continuous, or occasional, consumption by an animal. This can prove especially useful for domesticated "household pets" which are left alone for extended periods of time, such as when owners are at work, on vacations, or traveling. However, it is readily apparent to any animal owner or raiser, that an unlimited supply of food is not viewed as such by the animal. That is, the animal tends to gorge itself on the food presented either through instinct, or lack of training. The animal assumes that this food is the short term supply presented by the owner and that more food will be available. Therefore, when exposed to a large supply of food, the typical animal consumes most of it in short order and does not ration the food over the long term it is really meant for.

Another drawback in leaving a large supply of food exposed is that while it lasts through long term storage in a "dry state", a significant amount of moisture such as through rain or "splash over" shortens the storage time. Moisture breaks down the dry food and causes it to spoil in short order, or causes it to assume an appearance or texture that the animal finds unpleasant and, therefore, will not eat.

In order to solve these above problems various machines or devices have been proposed and built for dispensing dried foodstuffs over an extended period of time and in predetermined quantities.

Exemplary devices for dispensing food for consumption by animals are found in U.S. Pat. Nos. 3,528,588, 3,648,660, and 3,340,851. These patents disclose the use of a variety of rotary mechanisms for transferring predetermined amounts of food from a storage container to a consumption location. While each of these devices address the food dispensing process for animals in general, they have several inherent limitations such as being driven by very powerful rotary motor mechanisms which can hurt children playing around such machines. Other drawbacks include the inability to handle large amounts of food without clogging or jamming, a high cost of manufacture, and complicated and hard to maintain structures that are not very portable.

Therefore, what is needed is an apparatus that is simple to construct, reasonably lightweight, and very safe to operate in a highly mobile and household pet environment.

SUMMARY

In view of the above problems and goals, the present invention provides an improved storage and automatic food dispensing apparatus for animal related foodstuffs. It is an object of the present invention to provide an apparatus for dispensing food which can hold a large volume of food without caking and jamming even in a reasonably high moisture environment.

It is a purpose of the present invention to provide an apparatus for automatically dispensing predetermined mounts of food into a container or location for consumption by an animal using a minimum number of low maintenance parts.

It is a further purpose of the present invention to provide an apparatus for dispensing foodstuffs for consumption by animals that is inexpensive to manufacture and easy to maintain.

These and other objects, purposes, and advantages are realized in an animal food product dispensing apparatus comprising a housing typically constructed from sheet metal materials and having a food dispenser port located on one side. A hopper or similar storage means for storing food is mounted inside the housing and has a feed port through which food is transferred by gravity flow to an articulated chute assembly. The articulated chute assembly which has bottom and side walls for confining and guiding food, is positioned to capture food exiting through the feed port and transfer it to a dispenser port. A reciprocating driver means coupled to the chute means moves portions of the chute assembly up and down with respect to a fixed pivot port adjacent the feed port between a first position for collecting food and a second position for dispensing food from the chute assembly. A lower support means can be used adjacent to the storage means for supporting a lower portion of the storage means and guiding food from the feed port into the articulated chute assembly.

In a preferred embodiment, the storage means comprises a hopper formed in the shape of an inverted frustrated pyramid with a wider top end and a narrower bottom end, being open on both ends, with the bottom end comprising the feed port. The sides of the hopper slant downward at an angle of between 40 to 50 degrees from a vertical axis. An upper dispensing chute is pivotally supported on a first end adjacent to and across the hopper bottom end to intercept food exiting through the bottom end. The upper chute bottom wall obtains a first rest angle on the order of 40 to 50 degrees with respect to the vertical axis in the first position and a second rest angle on the order of 90 degrees in the second position. A lower dispensing chute is pivotally connected on a first end to a second end of the upper chute and supported on a second end to extend into the dispenser port with the lower chute bottom wall obtaining a third rest angle on the order of 55 to 65 degrees with respect to the bottom wall of the upper chute in the first position.

The reciprocation means comprises an AC or DC electric motor having a shaft turning at a predetermined rate with a cam attached to the shaft and a push bar secured on one end to the cam and on the other end to the articulated chute means. A switch means provides electrical power to the motor, when said articulated chute means is not substantially in the first position and relay means provides electrical power to the motor for a predetermined length of time regardless of the position of said articulated chute means.

In further aspects of the invention the hopper further comprises an adjustable metering plate positioned to slide across at least a portion of the bottom open end. A guide means can be mounted adjacent the dispenser port for supporting and guiding the lower dispenser chute and prevent interference or binding between the lower chute and adjacent sidewall structures.

The housing and storage means are made from galvanized sheet metal or stainless steel with the articulated chute means preferably made from stainless steel. The housing typically comprises a plurality of vertical sidewalls with a removable cover and the dispenser port located in one sidewall. In addition, a plurality of support legs are formed into the housing for holding the food dispenser off of the ground and in a fixed location.

BRIEF DESCRIPTION OF THE DRAWINGS

The novel features of the present invention may be better understood from the accompanying description when taken in conjunction with the accompanying drawings, in which like characters refer to like parts and in which:

FIG. 3 is a front view of an adjustable feed plate used in the food dispenser of FIG. 1.

FIG. 4 is a perspective view of a chute dispensing mechanism employed in the food dispenser of FIG. 1;

FIG. 5 is sectional side view of the chutes and hinges employed in the mechanism of FIG. 3.

DETAILED DESCRIPTION OF A PREFERRED EMBODIMENT

The present invention comprises an apparatus for automatically dispensing food products for animal consumption. This is accomplished in a food dispenser having a box-like housing formed from a folded external sidewall and a removable top cover. The housing supports a food hopper for holding stored food and presenting it to a motor actuated food dispensing mechanism which automatically meters a predetermined amount of food from the hopper to a dispenser opening on one side. The dispensing mechanism comprises upper and lower dispenser chutes pivotally secured to each other and to a guide plate supported below the hopper. The chutes are actuated by a push lever coupled to a cam driven by an electric motor so as to transfer predetermined amounts of food from the hopper to the dispenser opening.

Figure 1:
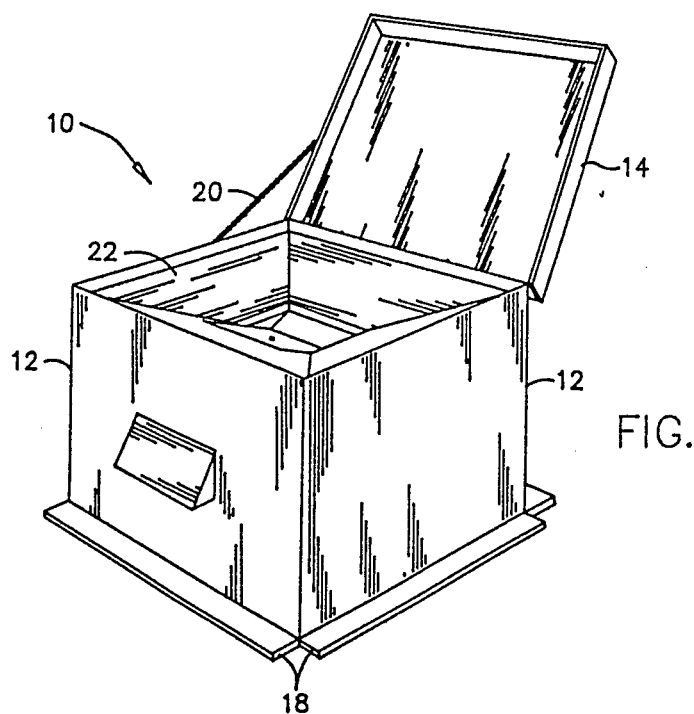
FIG. 1 is a perspective view of a food product dispensing apparatus constructed according to the principles of the present invention.

A food dispenser constructed according to the principles of the present invention is illustrated in perspective in FIG. 1. In FIG. 1, a food dispenser 10 is shown having a generally rectangular box-shaped outer enclosure or housing formed by four vertically extending sidewalls 12, a hinged cover 14, and a support platform 16 (not shown in FIG. 1) having support feet 18. To prevent the cover 14 from falling back and deforming the hinge (not shown in FIG. 1) or sidewall, a restraint cord, chain, or bracket 20 is provided between one edge of the cover 14 and a sidewall 12. Alternatively, the cover 14 can be made totally removable as where it employs a lip to fit over the sidewall 12. The top edge of the sidewalls 12 support the upper portion of a food storage hopper 22 just visible inside the dispenser 10 in FIG. 1.

Figure 2:
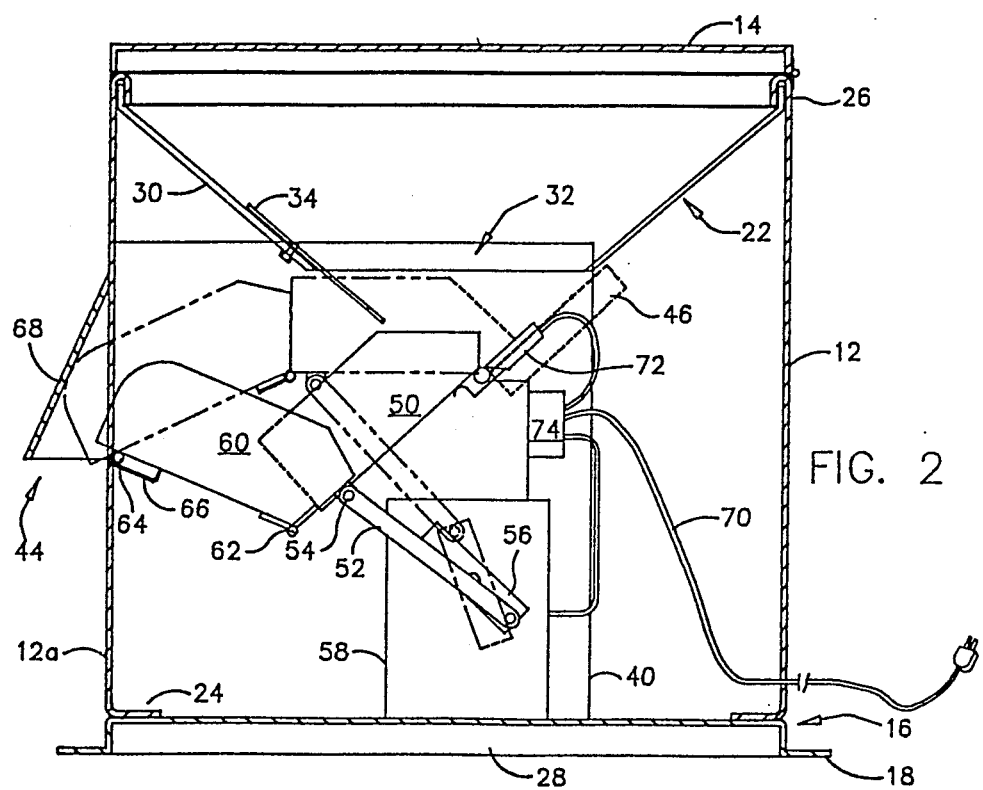
FIG. 2 is a sectional side view of the apparatus of FIG. 1.

The internal structure and operation of the food dispenser 10 is shown in more detail in the sectional view of FIG. 2. In FIG. 2, the sidewalls 12, are shown in cross section mounted on the support platform 16 and holding an upper portion of the hopper 22.

The sidewalls 12 are made from relatively lightweight, strong, and weatherproof materials such as, but not limited to, 18 to 20 gauge galvanized sheet metal or stainless steel. Galvanized sheet metal is preferred because it allows the food dispenser 10 housing to be manufactured inexpensively and provide a long service life. Durable weatherproof paints can also be applied to this surface to improve longevity and aesthetics. Alternatively, some plastic materials can be used for the sidewalls 12, although they have an attendant disadvantage of possible food contamination.

The dimensions of the sidewalls 12 depend on the size of the hopper 22 and related components to be contained within the dispenser 10. The preferred sizes for the sidewalls 12 are 12 or 16 inches square in order to form the most convenient sized food dispensers for storing a few days food for an average pet. The larger the size the harder food dispenser 10 is to move or handle. However, it will be clear to those skilled in the art that the principles of the invention are not limited to these dimensions but may be varied according to the specific applications and the food dispensation amount desired.

Using well understood principles of sheet metal forming, the sidewalls 12 are formed with a right angle projection or flange 24 approximately 0.5 inches wide on a lower or base edge adjacent to the support platform 16. This lower edge projection is used as the base support for mounting the bottom of the sidewalls 12 to the support platform 16. The mounting is accomplished using a series of sheet metal screws, bolts, or even spot welding. However, removable fasteners are preferred so that the food dispenser 10 can be disassembled for transport or maintenance.

At the same time, the sidewalls 12 are formed with an approximately 180 degree bend or fold 26 about 1 inch wide along the upper edge where they contact the hopper 22. The fold 26 secures the upper portion of the hopper 22 in place by pressing over and grasping top edges of the hopper 22 sides.

In the preferred embodiment, a single piece of sheet metal the length of three sidewalls is folded at right angles every third of its length to form a three sided "C" shaped wall. Since internal components of the food dispenser 10 are mounted on the support platform 14 first, the use of the "C" shaped wall facilitates construction because the open wall space allows clearance for these components and easy access for tightening bolts or other fasteners in place.

A fourth sidewall (second piece) is then mounted as a separate piece and the vertical sidewall edges joined together by means such as, but not limited to, spot welding or sheet metal screws, to form a unitary outer wall structure for the food dispenser 10. It will be apparent to those skilled in the art that four separate pieces or a single folded piece of material could be employed for the sidewalls 12. However, these other techniques make construction more difficult.

The sidewalls 12 rest on the support platform 16 which has the elongated, rectangular support feet or legs 18 for supporting the food dispenser 10 off of the ground or other surface. The feet 18 can also have holes for fasteners such as screws to fix the food dispenser 10 in place.

The support platform 16 is formed with a series of short sidewalls 28 adjacent the feet 18 for increasing the support strength and rigidity of the platform support surface. These sidewalls are generally formed as an integral part of the feet 18 when sheet metal is folded in a series of right angle bends to form the feet. An exemplary height for the walls 28 is 2 inches, although other heights can be used. Additional support walls can be placed at intermediate positions under the support platform 16 for large size platforms.

As shown in FIGS. 1 and 2, the hopper 22 is shaped like an inverted frustrated pyramid having a wide top portion and a narrower base. The hopper 22 is formed using four walls 30 that slant inward and downward toward the support platform 16 from the upper edge of the sidewalls 12. The top of the hopper 22 is open for receiving food to be dispensed by the food dispenser 10 and is covered by the top cover 14. Although illustrated as a flat cover, the cover 14 can also be curved for aesthetics and clearance for extra food. The base of the hopper 22 has a passage or opening 32 formed therein for dispensing food as described below.

The hopper 22 is formed using standard sheet metal forming techniques and by joining individual pieces together along the edges. Spot welding is preferred to fasten individual pieces together since the hopper 22 is meant to form a unitary and substantially rigid structure without internal projections to interfere with the flow of food. Although the preferred embodiment uses four sidewalls, alternate geometric shapes can be employed provided they dispense food easily and without clogging. However, other shapes tend to be more costly and difficult to manufacture.

The upper edges of the hopper walls 30 have a projection or edge that extends into the fold 26 formed in the sidewalls 12. This supports the upper part of the hopper 22 in place but allows removal for repairs, cleaning, or disassembly. If desired, a screw, latch, or bolt arrangement can be used to secure the hopper 22 to the sidewalls 12.

The sides 30 of the hopper 22 are slanted at an angle of about 45 degrees with respect to a vertical axis which is substantially parallel to the direction of the earths gravitational force. In the preferred embodiment, the support platform 16 is generally perpendicular to the vertical axis and the sidewalls 12 are parallel to this axis. This angle can be varied slightly for manufacturing convenience but has a definite impact on the operability of the feeder 10. That is, if the sides 30 slant downward at too steep an angle then the food tends to press down on the bottom of the hopper 22 and jam the opening, especially where dry food is exposed to moisture and can cake together under pressure. The food can also flow in larger quantities than desired into other portions of the feeder 10, making dispensing small controlled portions of food very difficult. If the sides 30 slant downward at too small an angle then food does not flow easily and can also cake in place or dispense in improper amounts. Therefore, an angle in the range of 40–50 degrees is preferred with 45 degrees being the most preferred.

When the sidewalls 12 are on the order of 16 inches square the top of the hopper is approximately 16 inches square and the height of the hopper, from the opening 32 to the top, is approximately 7 to 8 inches.

As seen in the perspective view of FIG. 1, the opening 32 is generally rectangular in shape with dimensions on the order of 2.75 by 6 inches when the sidewalls 12 are 12 inches square and 3 by 8 inches when 16 inch sidewalls are used. While it will be apparent to those skilled in the art that these dimensions can be adjusted to suit particular manufacturing situations, they have a direct impact on the amount of food dispensed as will be apparent from the operational description provided below.

In order to adjust the amount of food passing through the passage or opening 32 an adjustable metering plate 34 can be provided on one wall 30a of the hopper 22. Such a plate is illustrated in a front plan view in FIG. 3 where the plate 34 is shown slidably mounted on a wall 30a for extending into the opening 32. A slot and bolt combination 36 is used to secure the plate 34 in place and allow adjustment. In the preferred embodiment, a plate as wide as the widest part of the opening 32 and about 4 inches high was employed.

A scale 38 is conveniently provided along one side edge of the plate 34 for determining the relative change of position with respect to the opening 32. This allows adjustment by the food dispenser 10 owner with reproducible results when changes in feeding habits are dictated or desired.

Also shown in FIGS. 2 and 4 are two lower hopper supports 40 which are mounted on the support platform 16. These supports are secured in place using fastening means such as bolts or screws through holes in a flange or right angle projection 42 extending from the lower perimeter of the supports in a manner similar to those used on the sidewalls 12. The projections 42 are shown in more detail in FIG. 4, and are angled to coincide with the angled bottom of the hopper 22, here 45 degrees, along the upper edges of the supports 40a and 40b.

The lower hopper supports 40a and 40b are positioned to extend from one sidewall 12a (front) having a food dispenser opening 44 to a position just beyond the edge of the hopper opening 32 farthest away from the opening 44. In constructing the food dispenser 10 the lower supports 40 are preferably mounted on the support platform 16 before the sidewalls 12. This allows the hopper 22 to be placed on top of the supports 40 before the sidewalls 12 are slid over the top edge of the hopper 22 to secure it in place.

During operation of the food dispenser 10, food stored in the hopper 22 presses downward under the force of gravity and passes out through the opening 32 in the bottom of the hopper 22. Upon exiting the opening 32, the food engages the sides of the supports 40 and a guide plate 46 suspended therebetween. The food is guided by the guide plate 46 and the supports 40 into an upper dispenser chute 50 which is pivotally secured on one end to the guide plate 46.

One end of the guide plate 46 supports the hopper 22 along with the upper edge of supports 40a and 40b. The guide plate 46 has two sidewalls that are used to secure it to the supports 40a and 40b using bolts or other fastening means. The guide plate directs food into an open end of the upper dispenser chute 50.

One end of the upper dispenser chute 50 is mounted on the food guide plate 46 using a hinge 48 which pivotally secures the chute 50 in place and allows up or down motion of the other end relative to the hopper 22 and the vertical axis of the dispenser 10. The chute 50 normally rests across the opening 32 at a downward angle approximately the same as the projected angle of the hopper sides 30. The upper chute 50 has a sidewalls disposed along its length for confining food deposited therein but is open on both ends for transferring food into and out of the chute. In the preferred embodiment, the sidewalls of the chute 50 are about 2 inches tall. The upper chute 50 is made of materials such as, but not limited to, stainless steel or aluminum.

The hinge 48 comprises a typical hinge element as known in the hardware and machine arts having two mating leaves and a center pin. The pin, or one of the leaves, may be removable for assembly and service of the upper chute 50. The hinge 48 can be secured in place by welding the leaves to the chute and guide plate or by using bolts passing through the hinge leaves. Welding is preferred because of its low surface profile and permanency. When using bolts a pan head or oval head bolt is preferred so that the head of the bolt can reside in the upper chute 50 or on the guide plate 46 without impairing the flow of food from the hopper 22.

The free end of the upper dispensing chute 50 opposite from the hinge 48 is connected to a push rod 52 using a bracket and pin assembly 54 mounted adjacent to the end of the chute 50. In the preferred embodiment, the bracket assembly 54 comprises a pair of L shaped angle pieces made of material such as aluminum, which is welded or otherwise fastened to the chute 50. A pin or bolt extends through holes in each of the angle pieces and a matching hole in the end of the push rod 52. The pin is secured in place using means known in the art such as a cotter pin, or threaded ends.

The other end of the push rod 52 is connected to a motor and drive assembly for actuation. The motor and drive assembly comprises a cam 56 driven in a rotating motion about a central axis by a motor 58. The motor 58 can be either an AC or DC motor with each type being preferred for specific applications. The motor horse power need not be very large since the food moves through the dispenser chutes under gravity power and the pressure of the food on the upper chute 50 from the hopper 22 is not very large. An exemplary motor used in the preferred embodiment is a 0.35 ampere AC motor turning at 1 revolution per minute.

The push rod 52 is connected to the cam 56 at a radial position offset from the central axis of rotation. Therefore, as the motor 58 propels the cam 56 in a circular motion the end of the push rod is driven in a circular motion and the end of the push rod 52 connected to the bracket assembly 54 moves up and down, closer and farther from the motor 58.

This type of reciprocating motion is well understood in the mechanical arts and those skilled in the art can adjust the length of the push rod 52 and the length of the cam 56 to obtain the degree of lateral motion desired for the end of the push rod 52 and upper dispenser chute 50. It is important to remember that the upper chute 50 rests at the same angle as the sides 30 of the hopper 22 when in its lower most position and generally parallel to the support platform 16 (perpendicular to the sidewalls 12) in its raised position. The position of a lower chute 60 described below also impacts on the dimensions of the cam 56 and the push rod 52.

The end of the upper dispenser chute 50 facing the sidewall 12a and the dispenser opening 44 is coupled to a lower dispenser chute 60. The two chutes are joined together by a hinge 62 which is similar to the hinge 48. Again the leaves of the hinge 60 can be welded or bolted in place.

The preferred pattern for fastening the hinges 48 and 62 in place against the chutes 50 and 60 is illustrated in further detail in FIG. 5. This particular arrangement of the hinges 48 and 62 leaves has proven to provide smooth food transfer with strong support for the chutes.

The lower dispenser chute 60 is constructed in the same "C" shaped cross section as the chute 50 with the width of the sidewalls of the lower chute 60 being wider for insertion of the chute 50 therebetween. Exemplary chutes 50 and 60 are on the order of 3 to 4 inches in length. The end attached to the chute 50 terminates at an angle of approximately 60 degrees or more from the bottom of the upper chute 50 in order to allow the chute 60 to assume a 60 degree angle with respect to the upper chute 50.

The other (free) end of the lower dispenser chute 60 rests on a support pin 64 and extends through the dispenser opening 44. This end of the lower chute 60 is slightly rounded on the upper portion to clear a cover 68 provided for the opening 44. The opening 44 is larger than the lower chute 60 to allow free movement of the end of the chute 60 in and out of the opening 44. The bottom of the opening 44 and the support pin 64 are positioned vertically on the sidewall 12a so that they are below a projection of the bottom of the upper chute 50 when it is in its upper most position adjacent the hopper opening 32. This positioning causes the lower chute 60 to slant downward from the end of the upper chute 50 when the upper chute is raised next to the hopper opening. In this position food on the chute 60 slides down the chute and through the opening 44.

The support pin 64 is secured on each end to one of the supports 40. The preferred embodiment employs a small metal rod, about 0.25 inch diameter, for the pin 64 which is threaded on each end. The rod is inserted through matching (aligned) holes in the supports 40a and 40b adjacent the opening 44 and then secured in place by a pair of nuts. At the same time, a guide bracket 66 is used to clamp around the pin 64 and prevent the lower chute 60 from lifting off of the pin 64 any appreciable distance. However, the bracket 66 does not hold the chute 60 tightly against any lower surface and allows some upward motion of the chute 60 bottom. This prevents binding and is safe for fingers or paws inserted into the opening 44. The bracket 66 can be a strip of material such as stainless steel or aluminum which is fastened on each end to the bottom of the chute 60. A raised portion intermediate of the ends of the bracket 66 allows for clearance around the pin 64.

During operation, the motor 58 turns the cam 56 which moves the push rod 52 and lowers the upper chute 50 away from the hopper opening 32. Food in the hopper slides down the guide plate 46 and into the upper and lower chutes 50 and 60, respectively. When food is to be dispensed the motor 58 is activated and the upper chute 50 is raised closer to the hopper opening 32. At the same time, food on the end of the chute 50 adjacent the chute 60 will slide down the lower dispenser chute 60 and out of the opening 44.

A plate or similar dish can be provided for catching and further confining the food. To help direct food to such a container and prevent an animal from reaching food within the food dispenser 10, the cover 68 is provided for the opening 44. This cover can be held in place using a variety of fastening means. A preferred method is to use projections or bends along the edges of the cover 68 sides which are secured to the sidewall 12a adjacent the opening 44.

The motor 58 is illustrated as deriving its power from a power cord 70 which is connected to an electrical source (not shown). The motor 58 receives electrical power through both a microswitch 72 and a relay 74. This arrangement allows the motor to be driven through precisely timed cycles which help meter the amount of food dispensed.

The microswitch 72 is configured as a "normally closed" switch which transfers electricity to the motor 58 when the switch contact is not depressed by the upper chute 50. Since the motor and, therefore, the cam 56 turns a complete revolution every minute, it takes 60 seconds for the upper chute 50 to remake contact with the switch 72 once it has broken contact. If the motor is powered only through the microswitch 72, then the chute 50 would pivot up closer to the hopper 22, dump food down the lower chute 60 through the opening 44, and return to its lowered position for refilling and stop.

What is needed is a starter switch (not shown) connected between the power source and the motor 58 which is held in a closed contact position long enough to start the chute 50 in motion away from the switch 72 so that it closes contact. To assist in this operation and allow further variations in food dispensing a relay 74 is used.

The relay 74 is a timer type relay, that is, the relay delivers power to its output for a predetermined length of time after it is triggered. Therefore, a momentary contact switch would trip the relay 74 which delivers power for a predetermined length of time. This allows the use of a very brief starting pulse and alleviates any guesswork of how long to wait before the contact on the microswitch 72 is made. In addition, the timing of the relay 72 is used to advantage in the present invention because of the time it takes for the motor 58 to rotate the cam 56.

By increasing the internal timing of the relay 74 to longer than 60 seconds, with 75 seconds being preferred, the motor will keep running when the upper chute 50 contacts the microswitch 72. Therefore, the upper chute 50 will again move away from the switch 72 and a second 60 second period will occur before the motor turns off. This allows the food dispenser 10 to deposit two predetermined amounts of food through the opening 44.

It will be apparent to those skilled in the art that the addition of more relays 74 or alterations to the timing cycle duration of the relay 74 can be used to increase or decrease the amount of food collected and transferred by the dispenser chutes 50 and 60.

In the preferred embodiment, a momentary contact switch is not used to activate the relay 74. Instead a timer or similar remote device (not shown) is used to send the initial pulse of electricity to the relay 74. At the same time, the timer can turn itself on and off at very long intervals of several hours, further adjusting the food dispensing cycles to the needs of an animal.

By using the adjustable plate 34, the microswitch 72, relay 74, and the dimensions for the hopper 22 and opening 32 of the preferred embodiment, it was found that food dispensing could be predictably adjusted from 2 to 22 ounces in the 12 inch (sidewall) size food dispenser. The larger 16 inch size with two relays will dispense up to 44 ounces. The present invention advances the art by being able to reproducibly meter a large variation of both small and large amounts of food.

What has been disclosed is a new type of food dispensing apparatus for dispensing food for consumption by animals which advances the art do to its improved safety, adjustable food dispensation, and low cost and maintenance.

The foregoing description of a preferred embodiment has been presented for purposes of illustration and description. It is not intended to be exhaustive nor to limit the invention to the precise form disclosed, and many modifications and variations are possible in light of the above teaching. The embodiment was chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim is:

1. An automated food dispensing apparatus for storing and dispensing food products to animals, comprising:

a housing having a dispenser port;

storage means disposed within said housing for storing food, having a feed port through which food is transferred under the influence of gravity;

articulated chute means having bottom and side walls for confining and guiding food, positioned between said storage means and said dispenser port for moving a predetermined amount of food therebetween and positioned to capture food exiting through said feed port, said chute means comprising:

an upper dispensing chute pivotally supported on a first end adjacent to and across said feed port; and a lower dispensing chute pivotally connected on a first end to a second end of said upper chute and supported on a second end to extend into said dispenser port in said housing; and reciprocating driver means coupled to said chute means for moving it in an up and down pattern adjacent said storage means feed port between a first position for collecting said predetermined amount of food and a second position for dispensing food along said chute means and through said dispenser port.

2. The food dispensing apparatus of claim 1 further comprising lower support means connected to said storage means adjacent said feed port for supporting a lower portion of said storage means and having at least two vertically extending walls for guiding food exiting said feed port into said articulated chute means.

3. The food dispensing apparatus of claim 1 wherein said storage means comprises a hopper formed in the shape of an inverted frustrated pyramid with a wider top end and a narrower bottom end, being open on both ends, with said open bottom end comprising the feed port.

4. The food dispensing apparatus of claim 1 wherein said upper and lower chute bottom walls obtain a rest angle on the order of 55 to 65 degrees with respect to each other in the first position.

5. The food dispensing apparatus of claim 1 wherein said upper and lower chute bottom walls obtain a rest angle on the order of 60 degrees with respect to each other in the first position.

6. The food dispensing apparatus of claim 1 further comprising guide means mounted adjacent said dispenser port for supporting and guiding said lower dispenser chute and prevent obstruction of the lower chute adjacent structures.

7. The food dispensing apparatus of claim 1 wherein said reciprocation means comprises:

an electric motor having a shaft turning at a predetermined rate;

a cam attached to the shaft; and a push bar rotatably secured on one end of said cam and rotatably on the other end to said articulated chute means.

8. The food dispensing apparatus of claim 6 further comprising:
   switch means for providing electrical power to said motor when said articulated chute means is not substantially in the first position; and
   relay means for providing electrical power to the motor for a predetermined length of time regardless of the position of said articulated chute means.

9. The food dispensing apparatus of claim 7 wherein said electric motor is of the DC type.

10. The food dispensing apparatus of claim 1 wherein said articulated chute means is made from stainless steel.

11. An automated food dispensing apparatus for storing and dispensing food products to animals, comprising:
   a housing having a dispenser port;
   a hopper disposed within said housing for storing food, said hopper formed in the shape of an inverted frustrated pyramid with a wider top end and a narrower bottom end, being open on both ends, with said open bottom end comprising a feed port through which food is transferred under the influence of gravity,
   said hopper having four side walls that slant at an angle on the order of 40 to 50 degrees with respect to a vertical axis;
   articulated chute means having bottom and side walls for confining and guiding food, positioned between said hopper and said dispenser port for moving a predetermined amount of food therebetween, said chute means comprising;
      an upper dispensing chute pivotally supported on a first end adjacent to and across said bottom end so as to intercept food exiting through said bottom end with said upper chute bottom wall obtaining a first rest angle on the order of 40 to 50 degrees with respect to the vertical axis in a first position and a second rest angle on the order of 90 degrees in a second position; and
      a lower dispensing chute pivotally connected on a first end to a second end of said upper chute and supported on a second end to extend into said dispenser port in said housing with said lower chute bottom wall obtaining a third rest angle on the order of 55 to 65 degrees with respect to the bottom wall of the upper chute in the first position; and
   reciprocating driver means coupled to said chute means for moving it in an up and down pattern adjacent said hopper feed port between the first position for collecting food and the second position for dispensing food along said chute means and through said dispenser port.

12. The food dispensing apparatus of claim 11 wherein said first rest angle is on the order of 45 degrees and said third rest angle is on the order of 60 degrees.

* * * * *